Feb. 25, 1936. C. H. CUNO 2,031,936
ART OF FORMING FILTERS
Original Filed April 21, 1933
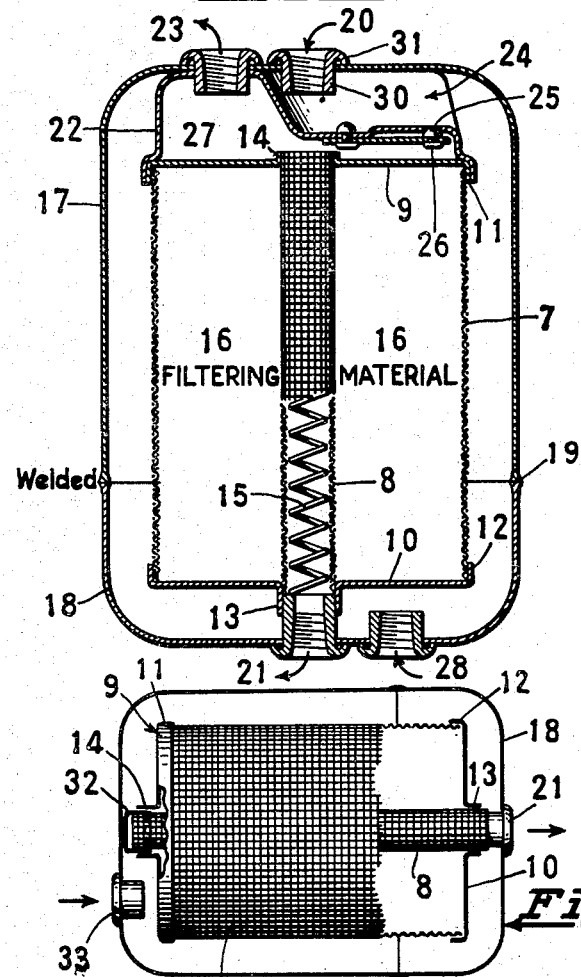
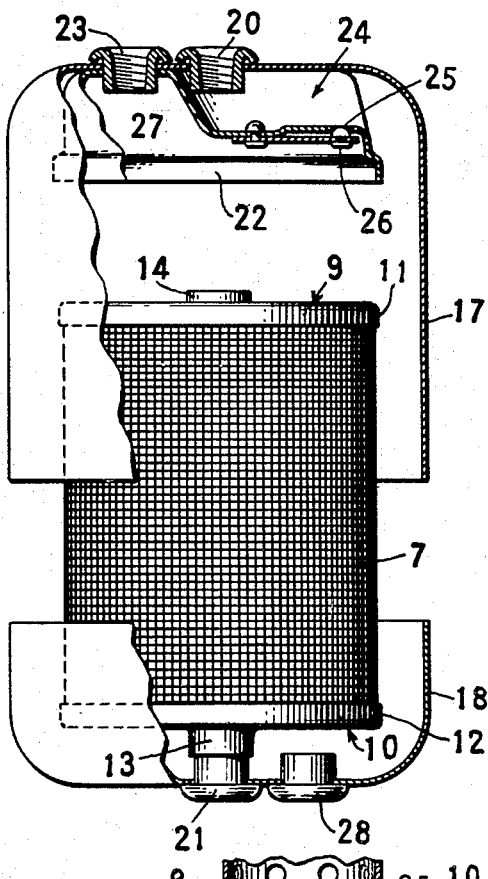
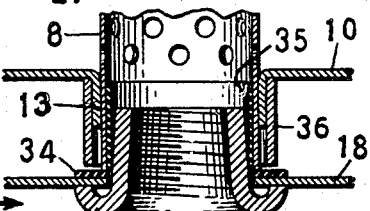
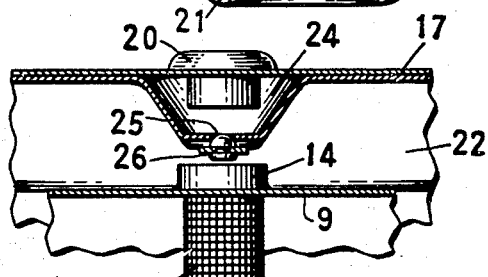
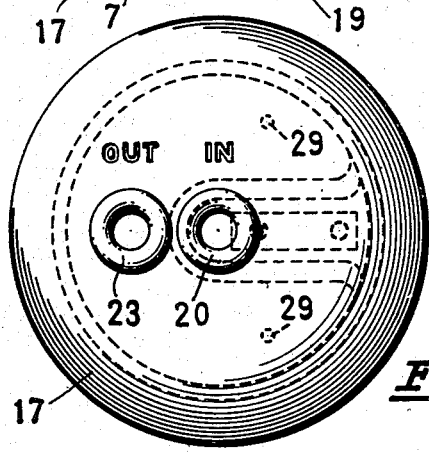
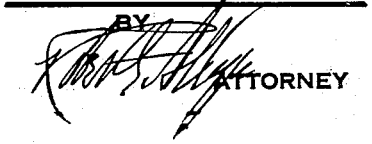
INVENTOR
CHARLES H. CUNO,
BY
ATTORNEY Patented Feb. 25, 1936

2,031,936

UNITED STATES PATENT OFFICE 2,031,936

ART OF FORMING FILTERS

Charles H. Cuno, Meriden, Conn., assignor to The Cuno Engineering Corporation, Meriden, Conn., a corporation of Connecticut Original application April 21, 1933, Serial No. 667,146. Divided and this application February 10, 1934, Serial No. 710,602

10 Claims. (Cl. 29—148.2)

My invention relates to a process or method of constructing filters or strainers for oil and the like and this application is a division from my application Ser. No. 667,146 filed April 21, 1933.

Constructions of the character involved are subjected to severe strains in handling and in use and in order to be commercially satisfactory must be constructed uniformly according to pre-designed plans.

It is also desirable that they be made as cheaply as possible and at the same time be reliable under all conditions.

It is also highly desirable that such filters be so constructed that they can be installed in various ways and adaptable to different filtering systems so that the manufacturer and dealer can satisfy a diverse trade from a limited number of sizes and designs.

It is also desirable that such constructions be adapted to be mounted or installed in various positions and that they be capable of successful operation under all temperature and pressure conditions customarily met with in practice.

It is also desirable that such constructions be capable of being readily installed by any ordinary person.

It is also desirable that such constructions be very light in weight and yet strong and durable.

It is also desirable that such constructions be capable of automatically by-passing oil in case the filtering areas become clogged.

It is also of the greatest importance that the casings be so constructed that they will not leak even though subjected to severe treatment and rough handling.

I have accomplished the desired results by the very simple construction and method of assembly set forth herein.

According to my invention the filter case or shell is formed of two sheet metal members of cup-like form which are connected at their open edges by electric welding. Inside of the shell is mounted the filtering cartridge which is supported from the opposite ends of the shell preferably by means of connections or nipples for the attachment of the oil device, these connections being preferably welded to the case.

The cartridge consists of inner and outer perforated or foraminous members connected by end pieces and with the space between filled by suitable filtering material such as asbestos, steel wool, slag or mineral wool, glass wool or substances such as limestone, diatomaceous earth, aluminum oxide or other absorbent or acid neutralizing minerals or incombustible materials useful for filtering purposes and suitable for the particular fluid to be filtered. It should be understood that the filtering medium may consist of any of the above listed types of material alone or in combination with one or more of the others.

Broadly considered the filtering means may be in any suitable form within the scope of the invention as claimed although preferably no combustible material is employed.

The sides or ends of the cartridge are spaced apart from the walls of the shells or case so as to leave an inlet chamber surrounding the filtering cartridge.

A number of additional nipples or connections may be provided for introducing liquid into the casing or discharging it from the casing. The cartridge and parts of the shell are constructed in such a manner as to permit them to be readily assembled and permanently secured in their proper relative positions as will be more clearly understood from the following specification.

Fig. 1 is a longitudinal sectional view of a filter construction made according to my invention.

Fig. 2 is an end view of the same.

Fig. 3 is an enlarged fragmentary transverse sectional view showing the inlet end of the filter.

Fig. 4 is a side view and longitudinal section showing the parts partially assembled according to my invention.

Fig. 5 is a longitudinal sectional view of a simplified construction made according to my invention and showing a part of the filtering unit in side elevation.

Fig. 6 is a sectional detail showing one way of insulating the parts of the filter cartridge or unit from one end of the shell to facilitate electric welding.

The filtering unit or cartridge has two perforated or foraminous walls 7 and 8 which may, for instance, be formed of woven wire rolled into tubular form. These walls are held spaced apart by the end discs 9 and 10 whose outer edges 11 and 12 are flanged over to surround the ends of the outer screen 7.

Central portions 13 and 14 of these end discs are also preferably flanged over to form positioning means for the ends of the inner screen 8. This inner screen may be reinforced by a helical member 15 if desired. The space 16 bounded by the screens 7 and 8 of the end discs 9 and 10 is filled with the filtering material and the parts of the cartridge are suitably secured together.

The shell of the filter consists of the two parts 17 and 18, the edges of which are welded together at 19. The nipple 20 admits the liquid to the chamber surrounding the filtering cartridge and the nipple 21 serves for the discharge of the filtered liquid. The cup-like head member 22 connects the upper end of the cartridge to the upper end of the case and a nipple 23 affords an additional outlet from the chamber between the discs 9 and the hood 22.

The hood is provided with an inlet channel 24 for the liquid to be filtered. The bottom of this channel may be provided with an opening 25 and a spring pressed valve member 26 so as to bypass liquid in case an excessive pressure is built up and to permit oil to flow directly to the outlet in case the filter for any reason fails to pass a sufficient quantity of oil.

The chamber 27 affords an auxiliary outlet 23 leading either from the center of the tubular screen 8 or from the bypass outlet 25. An additional inlet 28 may be provided if desired.

In the process of making the filter construction the two parts 17 and 18 of the shell are suitably drawn or formed out of sheet metal such, for instance, as comparatively soft steel and the ends are punched to receive the connecting nipples 20, 21, 23, and 28. These nipples are of tubular form with portions 30 made to substantially fit the openings in the ends of the shell. Each nipple has a flange 31 which is preferably curled outwardly somewhat to form a relatively thin edge adapted to be electrically welded to the head of the shell.

If the metal of the shell is sufficiently thick it is possible to form the inlet and outlet nipples or connections integrally with the respective parts of the shell.

Each nipple is preferably threaded internally to receive an inlet or outlet pipe (not shown). The hood 22 is also preferably spot welded to one head of the shell near the same point where the outlet nipple 23 is connected.

It may also be welded at a number of other points such as 29 such as shown in Fig. 2 to securely hold the parts together. The parts of the filter cartridge are suitably made and assembled. The filtering unit or cartridge is then positioned or centered with respect to one of the shell parts as, for instance, by slipping the flange 11 of the disc 9 into the flange of the hood 22 and at the same time bringing together the edges of the shell parts and centering the end of the inner tube 8 over the inner end of the shank of the lower nipple 21 as shown in Figs. 1 and 4. The shell parts are then electrically welded thus reducing the distance between the two heads of the shell parts and permanently positioning the filtering cartridge in the shell as shown in Fig. 1.

For welding it is of course necessary to confine the electric current to the parts being welded. It is therefore necessary when the heads and either screen of the filter unit are formed of conductive material that electric insulation be interposed. One simple method is to insert an insulating washer 34 and a bushing 35 between one head of the shell and the screen or tube 8 as shown in Fig. 6. This also shows a spacer collar 36 which prevents too much play in the final assembly.

Although the parts of the shell are secured tightly together the filtering cartridge is capable of considerable yielding due to the resiliency of the parts, thus allowing for vibration and for expansion and contraction due to changes in temperature. This facility of expansion and contraction is desirable since the filter is frequently installed close to the engine where it is subject to the heat of the engine as well as heated oil.

Such a construction can be readily made by economical factory methods. It is strong but light and compact and has the advantages incident to these features. At the same time it is strong and durable and effective. The provision of the multiple inlets and multiple outlets makes the device universally interchangeable in various systems and facilitates installation and renewal.

The shell or casing being preferably of comparatively soft steel is capable of withstanding hard knocks without fracture.

The completed shell having its parts united autogenously is in effect seamless and has no joints which are likely to open up or leak. As no solder is required there is nothing to become disconnected by overheating.

In the construction shown in Fig. 5 the hood 22 is omitted but a positioning or centering device 32 is welded to the shell part 17 and coacts with the neck or flange 14 to position the parts in a manner similar to the engagement of the outer flange of the disc 9 with the flange of the main hood 22. In this case the entrance to the main chamber of the filter is through the inlet nipple 33.

It should be understood, however, that this casing might be provided with multiple inlets and outlets as described with respect to the other form of device.

It will be understood that the welding operations may be carried out by conventional forms of welding apparatus suitable for such work.

From the foregoing disclosure it will be seen that the centering devices 22 or 32 for example may position the filter cartridge with respect to the shell during the welding operation so that each of these centering sleeves permits limited longitudinal movement of the cartridge as the welding operation takes place to assist in supporting the cartridge at each end during welding and to provide an expansion joint between the shell and cartridge after the weld has been completed.

I claim:

1. The method of forming a filter having cylindrical cup-like shell members and an inner incombustible filter cartridge slidably positioned at one end on a nipple in one shell member and slidably positioned at the other end by a flanged hood eccentrically positioned upon another nipple within the other shell member, which comprises assembling the incombustible filter cartridge, slidably positioning one end of the cartridge in one of the shell members, slidably positioning the other end of the cartridge in the other shell member and welding the edges of the shell members together while thus slidably supporting the ends of the cartridge member.

2. In a method of making a filter the steps of forming cup-like shell members, securing at least one nipple to each shell member, forming a filter cartridge, securing a filter cartridge centering and supporting device to the inside of one of said shell members, slidably positioning one end of said cartridge in one shell on said centering and supporting device, slidably positioning the other end of said cartridge on the nipple in the other shell, and securing the edges of the shells together while permitting the cartridge to slidably adjust itself on the positioning means in the shell members.

3. The method of forming a filter which comprises forming two metallic cup-like shell members with inlet and outlet nipples, the outlet nipple being positioned approximately in the center of one shell member and providing means for slidably supporting one end of a filter cartridge, securing means to the opposite shell member for slidably supporting the opposite end of the filter cartridge, slidably positioning the opposite ends of the filter cartridge upon the respective supporting means, aligning the shell members and securing their edges together.

4. The method of forming a filter which comprises forming two metallic cup-like shell members with inlet and outlet nipples, the outlet nipple being positioned approximately in the center of one shell member, said nipple providing means for slidably supporting one end of a filter cartridge, forming a filter cartridge having a central tubular part, securing a hood member in the shell with the inlet nipple, said hood providing means for slidably supporting the other end of the filter cartridge, slidably positioning the one end of the central tubular part of the filter cartridge upon the outlet nipple, slidably positioning the outer periphery of the other end of the filter cartridge within the hood member, aligning the shell members and securing their edges together.

5. The method of forming a filter which comprises securing a filter cartridge within a metal cup-like shell member, welding upon the interior of a complementary metal cup-like shell member a means for slidably positioning the filter cartridge with respect to the shell, slidably supporting the filter cartridge with respect to one of the shell members while electrically insulating said cartridge from said shell, aligning the shell members and electrically welding their edges.

6. The method of manufacturing a filter which comprises positioning a filter unit between opposed cup-shaped shell members having their adjacent ends in substantial alignment with the sides of said cup-shaped members, axially moving said shell members relatively toward each other, and welding the adjacent ends of said shell members throughout substantially their entire angular extent in such manner that the weld is substantially aligned with the side walls of said cup-shaped shell members to form a liquid tight casing without any bent flanges on either of said cup-shaped shell members adjacent the weld.

7. The method of manufacturing a filter which comprises fastening a hood inside a cup-shaped shell member, securing inlet and outlet passages in the base of said cup-shaped member with one of said passages projecting through the hood, positioning a filter unit in said hood, axially moving an opposed cup-shaped shell member relatively to the first cup-shaped member and welding their adjacent edges to form a liquid tight casing without any bent flanges on either cup-shaped shell member adjacent the weld.

8. The method of manufacturing a filter which comprises positioning a filter unit within opposed separate cup-shaped shell members with the adjacent end of at least one of said shell members being unflanged and of the same size and shape cross section as the other, axially moving said shell members relatively toward each other while aligned, and welding the adjacent ends of said shell members throughout substantially the entire shell member periphery to form a liquid tight casing.

9. The method of manufacturing a filter which comprises supporting a filter unit within each of two opposed separate cup-shaped shell members of substantially the same cross sectional size and shape so that the filter unit may axially slide with respect to at least one of said shell members, axially moving said shell members relatively toward each other while they are held in alignment and butt-welding the adjacent and unflanged ends of said shell members.

10. The method of manufacturing a filter which comprises positioning a filter unit within opposed separate cup-shaped shell members with the adjacent end of at least one of said shell members being unflanged and of the same size and shape cross section as the other, axially moving said shell members relatively toward each other while aligned, welding the adjacent ends of said shell members throughout substantially the entire shell member periphery to form a liquid tight casing, and protecting the material of said filter unit from injury during the welding operation by metallic means of substantially 360° angular extent arranged radially between the filter material and the shell members at least longitudinally adjacent the weld.

CHARLES H. CUNO.